R. E. HUMBERT.
TOY.
APPLICATION FILED MAR. 17, 1919.
1,336,434.
Patented Apr. 13, 1920.
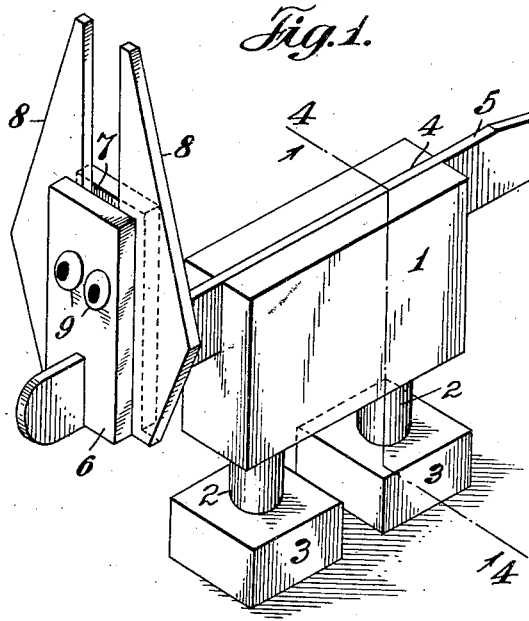
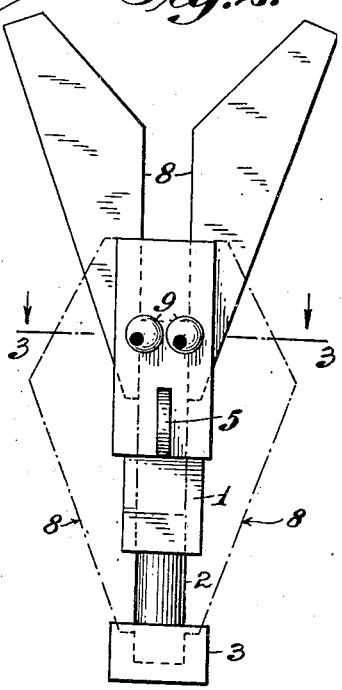
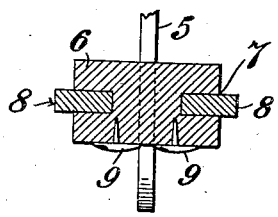
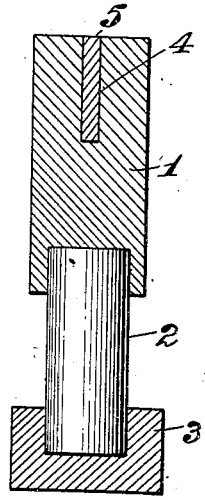
Inventor
Richard Edward Humbert
By his Attorney
Frank L. Boen

UNITED STATES PATENT OFFICE.

RICHARD E. HUMBERT, OF MONTCLAIR, NEW JERSEY.

TOY.

1,336,434.  Specification of Letters Patent.  Patented Apr. 13, 1920.

Application filed March 17, 1919. Serial No. 283,118.

*To all whom it may concern:*

Be it known that I, RICHARD EDWARD HUMBERT, a citizen of the United States, residing at Montclair, in the county of Essex and State of New Jersey, and having a post-office address at No. 26 St. Lukes Place, Montclair, N. J., have invented certain new and useful Improvements in Toys, of which the following is a full, clear, and exact specification.

My invention relates to improvements in toys, designed for the entertainment and amusement of young children. The toy comprises generally a series of animals adapted to be contained in a Noah's ark, and therefore in duplicate; but they may be individual and carried in any other suitable container. The toy is made of wood and is therefore durable, and safe for use with very small children. The animals represented are in a large sense imaginary, and only in a very general way represent real creatures. Very considerable variations can be made in the assembling of the parts comprising the animal, and in this way very queer and freakish animals can be made, according as the fancy of the child may direct.

In the accompanying drawing:

Figure 1, represents a perspective view of one of the animals embodying my present invention, illustrating generally the amusing character of animals secured thereby.

Fig. 2, a front view of the same, illustrating in full lines the ears in a different position from Fig. 1, and in dotted lines the ears in a third position.

Fig. 3, a section on the line 3—3 of Fig. 2, looking in the direction of the arrows, and Fig. 4, a section on the line 4—4 of Fig. 1.

In the above views, corresponding parts are represented by the same numerals.

Generally stated, my improved toy comprises an animal, the parts of which are disassembled but may be brought together in various combinations and arrangements, by means of slotted connections. The particular animal shown in the drawing is obviously imaginary, but it will be obvious that many other forms may be developed embodying the invention, and if desired equipped with horns, or tusks or a trunk, permitting the child to assemble the parts in such combinations as may be desired.

The body 1, is a rectangular block of wood, supported on two removable legs 2, in turn, carried by blocks 3 representing feet, removably secured to the legs. In the top of the body, is a longitudinal slot 4, in which is removably carried a member 5, comprising a tail, neck and a snout as shown. The head 6, which is a rectangular block straddles the member 5, and is formed with a slot 7 cut in its sides and top. In the slot 7, may be inserted the ears 8, 8 of any desired shape. By variously placing the ears in the slot 7, the appearance of the animal may be changed as shown in the drawings. If the animal is to be horned, representatives of horns may be inserted in the horizontal portion of the slot 7. The eyes 9 are preferably formed of enamel-headed tacks as shown. It will be obvious, that by making up a Noah's ark of animals of various sorts of the general type shown, all of disassembled parts, but having legs, bodies, tails, heads, ears, etc., all interchangeable, a great variety of strange and unusual combinations may be put together by the child, forming thereby a source of much entertainment.

Having now described my invention, what I claim as new therein and desire to secure by Letters Patent, is—

1. An improved toy, comprising a generally rectangular wooden body having a longitudinal slot therein, a flat neck engaging said slot and a slotted rectangular head straddling and supported by said neck, substantially as set forth.

2. An improved toy, comprising a generally rectangular wooden body having a longitudinal slot therein, a flat neck engaging said slot and a slotted rectangular head straddling and supported by said neck, said neck projecting beyond the head to form a snout, substantially as set forth.

3. An improved toy, comprising a generally rectangular wooden body having a longitudinal slot therein, a flat neck engaging said slot and a slotted rectangular head straddling and supported by said neck, said neck projecting beyond the head to form a snout, and extending beyond the body to form a tail, substantially as set forth.

4. An improved toy, comprising a generally rectangular wooden body having a longitudinal slot therein, a neck mounted in said slot, a rectangular head straddling and supported by said neck, said head being formed with longitudinal slots on its sides, and ears removably carried by said longitudinal slots, substantially as set forth.

5. An improved toy, comprising a generally rectangular body, a head removably carried by said body and eyes in the head formed of enamel-headed tacks, substantially as set forth.

This specification signed and witnessed this 12th day of March, 1919.

RICHARD E. HUMBERT.

Witnesses:
    LOUIS LARSEN,
    ARTHUR PETERSEN.